United States Patent Office 3,261,812
Patented July 19, 1966

1

3,261,812
ELASTOMERIC POLYESTERS OF DIACIDS, CYCLOHEXANEDIMETHANOL AND POLY(TETRAMETHYLENE GLYCOL)
Alan Bell, Charles J. Kibler, and James G. Smith, Kingsport, Tenn., assignors to Eastman Kodak Company, Rochester, N.Y., a corporation of New Jersey
No Drawing. Filed Aug. 9, 1962, Ser. No. 215,768
20 Claims. (Cl. 260—75)

This application is a continuation-in-part of our earlier application Serial No. 145,433, filed on October 16, 1961.

This invention relates to elastomeric polymers and more particularly to highly elastic polyester compositions suitable for the production of various products in which good elastic return is important. More specifically the invention relates to novel highly elastic polymeric compositions useful in the production of filaments, films and shaped articles having, not only excellent elastic properties, but also unexpectedly high tenacity or tensile strength.

In recent years filaments, fibers, films and the like produced from various polyester compositions have become very important to the textile industry. However, in some cases it has been extremely difficult to attain in one and the same material the combination of properties desired such as the required melting point, tensile strength and, in elastic materials, a good elastic recovery. The difficulty of obtaining the desired combination of properties has been recognized by some of the leading researchers in the polymer field. For example in Part II of an article by W. Hale Charch and Joseph C. Shivers appearing in the Textile Research Journal for July 1959, vol. 29, pages 536–540, entitled "Elastic Condensation Blocked Co-Polymers," these researchers state: "For the synthetic fiber technologist it is significant that many elastic polymer structures possess no chemical cross links; hence they can be melted or dissolved and spun into fine fibers by conventional methods. Unfortunately, however, the melting points of typical fibers from the classes of polymers mentioned above are too low to permit them to be ironed when used along with other fibers in a fabric. Hence, if one would have an elastic textile fiber, one confronts the awkward problem of combining good elastic properties, which call for a low polymer melting point and low transition temperature, with a high ironing temperature, which calls for a high melting point, in one and the same polymer."

In an apparent attempt to deal with some of the problems referred to in the Charch and Shivers article and to produce an elastomeric filament or fiber material having the desired elastic and other physical properties there is described in British Patent 779,054 the production, from a glycol such as ethylene glycol and aromatic dibasic acids or their esters, of a polyester material containing 35 to 75 percent by weight of the polyether-polyester unit. While apparently good elastic properties are attained in a filament or fiber produced from this composition, such fibers are said to have a tensile strength of the order of 0.1 gram per denier, which experience has shown is insufficient to meet the demands of the textile trade for a polyester filament or fiber material used in the manufacture of elastic or stretchable fabrics such as those employed in foundation garments, self-supporting stockings and similar elastic fabric constructions. See also U.S.

2

Patent 3,023,192, granted on February 27, 1962, in the name of J. C. Shivers.

In another article by T. B. Marshall, entitled "Manmade Elastic Yarns," appearing in Textile Industries, 125, #8: 75–80, August 1961, the author states: "For more than 13 years, chemists have been working actively on the development of elastomeric fibers that would represent an improvement over the natural and synthetic rubber yarns in common use. The first approaches were in the direction of modifying nylon and polyester polymers, but the fibers obtained, while highly promising, always turned out to be deficient in some respect, such as in hydrolytic instability or excess stress decay. Garments that could not stand hot water or ones that grew appreciably larger during the course of a day's wearing would have had little attraction for the American woman."

The present invention is related to the inventive concept of the polyester compositions described in our prior U.S. Patent 2,901,466, issued August 25, 1959, entitled "Linear Polyester and Polyester Amides From 1,4-Cyclohexanedimethanol." This application is also related to our copending application Serial No. 823,298, filed June 29, 1959, which is a related case with respect to the above-mentioned Serial No. 145,433. See also U.S. patent application Serial No. 151,557, filed November 10, 1961, now U.S. Patent 3,157,619, issued on November 17, 1964, wherein there is disclosed an advantageous process for the preparation of the highly polymeric fiber-forming elastomeric polyesters which are claimed in this application hereinbelow.

The invention has for its principal object to provide a highly elastic polyester composition especially adapted to the manufacture of filaments, fibers, yarns, films and other shaped objects having excellent elastic properties in conjunction with other valuable properties.

Another object is to provide a highly elastic polyester composition from which filaments, fibers and yarns having high tenacity, high elongation, good modulus of elasticity, excellent elastic return, high ironing temperature and excellent hydrolytic stability may be produced.

Another object is to provide stable filaments, fibers, and yarns having high tenacity, high elongation, good modulus of elasticity, excellent elastic return, high ironing temperature and excellent hydrolytic stability.

Another object is to provide stable films and other shaped objects having high tenacity, high elongation, good modulus of elasticity, excellent elastic return and excellent hydrolytic stability.

Other objects will appear hereinafter.

These objects are accomplished by the following invention which, in one embodiment, comprises forming a highly elastic highly polymeric polyester by reacting (A) at least one compound selected from the class consisting of the dibasic carboxylic acids and their esters with the combination of (B-1) at least one member of the group consisting of the cis or trans-isomers of 1,4-cyclohexanedimethanol and (B-2) the ether-glycol having the structural formula:

$$\text{HO}(\text{CH}_2\text{CH}_2\text{CH}_2\text{CH}_2\text{O})_n\text{H}$$

wherein $n$ is an integer from 14 to 90. This ether glycol is commonly known as poly(tetramethylene glycol) which is sometimes hereinafter abbreviated PTMG. Cyclohexanedimethanol is sometimes hereinafter abbreviated 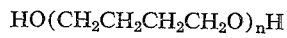CHDM.

In accordance with the invention the reaction is carried out in such manner that the above-defined dihydroxy moiety (CHDM+PTMG) contains at least 50 mole percent of said CHDM constituent (B-1). The PTMG constituent (B-2) consequently will constitute less than 50 mole percent of the dihydroxy moiety. To obtain the properties outlined in the objects of this invention as hereinabove stated the PTMG component should be present in an amount corresponding to 50 to 90 weight percent of the final polyester. When said percentage range is 75 to 90 percent, the CHDM should be present as substantially entirely the trans-isomer, i.e., less than 10 percent is the cis-isomer. Polyesters of this invention have a crystalline melting point greater than 150° C. and an inherent viscosity of at least about 1.3 up to 4.0 or higher and preferably within the range of 1.4 to 3.2.

The PTMG referred to above may consist of a mixture of polymers of various molecular weights, some low and some high, so that the molecular weights of such mixtures are average molecular weights. It can be seen that the distribution of the molecular weights of the individual polymer molecules may vary from sample to sample. Some samples can have a sharp molecular weight distribution, that is, the individual polymer molecules all tend to have the same molecular weight. Other samples can have a broad molecular weight distribution, that is, the individual molecules tend to have molecular weights which differ widely from one another. Thus the ability of the elastomeric polyesters of this invention, when stretched, to return to their original dimensions is enhanced quite unexpectedly and unobviously by the presence of PTMG constituents having a sharp molecular weight distribution.

It is convenient to establish an empirical measurement of this molecular weight distribution based on the inherent viscosity as measured on a 1% by weight solution of the PTMG in a solvent composed of 60 percent by weight of phenol and 40 percent by weight of tetrachloroethane and on the ebullimetric molecular weight measured in toluene. The inherent viscosity is related to the weight average molecular weight and the ebullimetric molecular weight is a number average molecular weight. Thus the ratio of the inherent viscosity to the ebullimetric molecular weight multiplied by 10,000 provides a convenient number for measuring the molecular weight distribution of the poly(tetramethylene glycol). This ratio generally falls within the range 0.9 to 2.0. A high value indicates a broad distribution, a low value indicates a sharp distribution. It is desirable that this ratio have a value of 1.25 or less in order to obtain elastomeric compositions having enhanced elastic properties. The preferred value of this ratio is less than 1.15. For the production of polyester products of optimum elastomeric properties according to our invention, such for example as filaments and fibers, we have found that $n$ preferably has an average value between 26 and 70 which represents an average molecular weight between about 1900 and about 5100. When $n$ is 14, the molecular weight is about 1025 and when $n$ is 90, the molecular weight is about 6490. Thus the broadest usable range is between about 1000 and about 6500. However, it is especially surprising that the higher range of molecular weights can be used in preparing good elastomeric fibers, viz., a range of 1900 upwards which is the preferred range.

In the following examples and description we have set forth several of the preferred embodiments of our invention but they are included merely for purposes of illustration and not as a limitation thereof.

The dicarboxylic acids which are useful for the preparation of the subject elastomeric polyesters are those in which the carboxylic acid groups are attached to a hexacarbocyclic nucleus in a para relationship and the entire hydrocarbon moiety contains 6 to 20 carbon atoms. Examples of hexacarbocyclic dicarboxylic acids wherein the carboxy radicals are attached to a hexacarbocyclic nucleus in a para relationship include terephthalic acid, trans-1,4-cyclohexanedicarboxylic acid, 4,4'-sulfonyldibenzoic acid, 4,4'-diphenic acid, 4,4'-benzophenonedicarboxylic acid, 1,2-di(p-carboxyphenyl)ethane, 4,4'-methylenedibenzoic acid, 1,2-di(p-carboxyphenoxy)ethane, 4,4'-dicarboxydiphenyl ether, 1,4- or 1,5- or 2,6- or 2,7-naphthalenedicarboxylic acid. The hexacarbocyclic dicarboxylic acids are preferably those containing a trans-cyclohexane nucleus or an aromatic nucleus containing from one to two benzene rings of which at least one has the usual benzenoid unsaturation. Of course, either fused or attached rings can be present. All of the compounds named come within the scope of this preferred group.

Occasionally a condition termed biphasing is encountered during the preparation of elastomeric polyesters. In such a situation the polymer in the molten state is opaque due to the formation of a second polyester phase. Two different polyester compositions exist together, one rich in poly(tetramethylene glycol), the other poor in this PTMG. Such polyesters are difficult to spin since at a spinning temperature which produces a melt of satisfactory viscosity for forming filaments, the melt contains some higher melting solids which block the spinnerette. Higher temperatures reduce the melt viscosity below a useful value.

To avoid biphasing, it is frequently desirable to use a small amount (2 to 20 mole percent of the overall dicarboxylic acids) of a second dicarboxylic acid as a modifier. This serves to increase the mutual solubility of the two polyester phases. The dicarboxylic acids most useful for this are the polymethylene dicarboxylic acids such as adipic, succinic, azelaic, suberic, pimelic, sebacic, etc., the branched aliphatic dicarboxylic acids such as 2-methyladipic, 2-ethylsuberic, 2,2,3,3-tetramethylsuccinic, etc., and the cycloaliphatic dicarboxylic acids such as the cyclohexanedicarboxylic acids, the cyclopentanedicarboxylic acids, etc. Such modifier acids advantageously contain from 2 to 40 carbon atoms.

Another group of compounds useful for the purpose of preventing biphasing are the hydroxy carboxylic acids. A few examples of these are hydroxybutyric acid, hydroxycaproic acid, hydroxypivalic acid, 4-hydroxymethylcyclohexanecarboxylic acid, etc. Such modifiers advantageously contain from 2 to 40 carbon atoms.

These modifier dicarboxylic acids or hydrocarboxylic acids may also contain ether linkages, thioether linkages, sulfonyl linkages, etc., as well as other substituents which do not adversely affect the behavior of such modifiers. Examples of such modifiers are 3,3'-thiodipropionic acid, thiodiglycolic acid, 3,3'-thiodibutyric acid, diglycolic acid, sufonyldipivalic acid, etc.

These modifiers may be considered, for the purposes of reducing biphasing, as aliphatic acids having from 2 to 40 carbon atoms; however, for most purposes, such acids can be advantageously employed which have from 2 to 12 carbon atoms.

DEFINITIONS

For purposes of clarity and of properly disclosing and defining our invention, the following definitions are given:

*Inherent viscosity (I.V.).*—This property, represented by $\{\eta\}$, which is used as a measure of the degree of polymerization of a polymeric compound, is calculated from the equation:

$$\{\eta\} = \frac{\ln \eta_r}{C}$$

wherein $\eta_r$ is the ratio of the viscosity of a dilute (approximately .25 percent by weight) solution of the polymer in a solvent composed of 60 percent by weight of phenol and 40 percent by weight of tetrachloroethane to the viscosity of the solvent itself, and C is the concentration of the polymer in grams per 100 cubic centimeters of the solution. The I.V. is advantageously measured at about 25° C.

*Tenacity or tensile strength.*—This is a measure of the strength of the fiber, filament or yarn under study. It can be expressed in grams per denier (g./d.) which is calculated by dividing the initial denier of the fiber under study into the tension (in grams) required to break the yarn. The values of tenacity reported in this patent application were in each instance determined by using a 2-inch specimen is an Instron tester at a rate of extension of the specimen of 1000 percent per minute in the testing machine.

*Elongation.*—This is a measure of the extent to which a fiber, filament or yarn is stretched when it breaks. It is expressed as a percentage and is calculated by dividing the original length of the sample into the increase in length and multiplying by 100. It is measured on an Instron tester machine under the same conditions as the tenacity of the fiber is measured. In the present disclosure such values are referred to as Machine Elongations. The Instron tester used was Model TM made by Instron Engineering Corp., Canton, Mass., U.S.A.

Because of the high elongations of elastomeric yarns, the fiber samples suffer a marked diminution of their diameters during their elongation. Thus samples mounted in the jaws of an Instron tester have a tendency to slip during the stretching and elongations determined in this manner may be somewhat larger than their true values.

A more accurate value is the so-called "hand elongation." This value is calculated in the same manner as described for the calculation of machine elongation. However, the measurement differs. Specifically, two marks 20 cm. apart are placed on the fiber sample and the sample is extended by hand until it breaks. The distance which separates the marks at the time of breakage is noted and the elongation calculated. The average of five or six such determinations is used as the value of the hand elongation of the sample in question. Approximately eight seconds are required to pull the fiber sample to the breaking point and this represents a rate of elongation of approximately 3000 percent per minute.

*Elastic recovery.*—This property is a measure of the ability of a fiber, yarn or filament to return to its original length after elongation. For the purpose of this invention, the elastic recovery of a sample is determined by drawing the sample to an elongation of 200 percent and then allowing it to return to a relaxed state (but not "snap" back). The amount of elongation which is recovered is divided by the original elongation and the result multiplied by 100 which gives the percent elastic recovery. A polymer is considered to be elastomeric if it is capable of sustaining an elongation of 200 percent or more and returns rapidly to essentially its original dimensions. The polyester fibers of this invention are much more than merely capable of at least 90 percent recovery after being elongated 50 percent at the rate of 100 percent per minute and held at the 50 percent elongation for one minute.

*Modulus of elasticity.*—As used herein modulus of elasticity may be defined as the tension in grams per initial denier per percentage elongation necessary to stretch the sample to the stated percentage elongation. When measuring the modulus of films the tension may be expressed in pounds per square inch.

*Permanent set.*—One of the most important properties an elastomer should possess is the ability to return rapidly to its original dimensions after deformation. If the sample does not return to its original dimensions, the distortion induced in the sample is termed permanent set and the amount of permanent set is expressed as a percentage of the sample's original dimensions. The amount of permanent set varies with the manner in which the deformation is effected and generally becomes greater when the stress is applied for a long period of time than when stress is applied for a short period of time.

For this reason, the following test was used to measure the permanent set of elastomeric fibers. Both ends of a 40 cm. length of fiber are clamped so that a loop of fiber is formed which measures 20 cm. in length. This double strand is drawn smoothly and rapidly to a length of 80 cm. (300 percent elongation) and then relaxed to a length of 50 cm. (150 percent elongation). This length is maintained for 16 hours after which the fiber is released and permitted to retract. The length of the fiber is measured one minute and 60 minutes after release, and the length in excess of the original sample length is expressed as a percentage of the original length. Normally this test is conducted in a room where the temperature is controlled at 21° C. and humidity at 65 percent.

*Crystalline melting point.*—This is defined as the temperature at which a sample of the polymer under test will flow under slight pressure on the well known Fisher-Johns melting point apparatus which is sold by Fisher Scientific Company, Pittsburgh, Pa., U.S.A.

*Molecular weight distribution of PTMG.*—The molecular weight distribution of the poly(tetramethylene glycol) can be determined by fractionating the polyether by well known methods. [See, for example, L. C. Case, Makromolec. Chem. 41, 61 (1960).] However, it is much more convenient to establish an empirical number based on the inherent viscosity of a 1 percent by weight solution of the polyether in a solvent composed of 60 percent by weight of phenol and 40 percent by weight of tetrachloroethane and on the number average molecular weight as determined ebullimetrically in toluene. The inherent viscosity is related to the weight average molecular weight so that the ratio of inherent viscosity divided by the number average molecular weight is a measure of a the molecular weight distribution of the poly(tetramethylene glycol). For convenience, this ratio is multiplied by 10,000 so that numerically the ratio is found to fall within the range of 0.9 to 2.0. A high value indicates a broad distribution, a low value indicates a sharp distribution.

Unexpectedly, we have found that the permanent set of fibers melt spun from the general class of polyesters described in our parent U.S. application Serial No. 145,433 is markedly reduced if poly(tetramethylene glycol) having a sharp molecular weight distribution is used in comparison with the permanent set of fibers spun from the same polyester composition containing poly(tetramethylene glycol) of broad molecular weight distribution.

This inventive concept is applicable to all elastomeric polyesters. It is particularly concerned with those compositions containing 75 to 90 percent by weight poly(tetramethylene glycol) of molecular weights in the range 1900 to 5100. The distribution ratio of the PTMG which gives the desired improvement of permanent set is below 1.25 and preferably below 1.15.

EXAMPLE 1

A vessel equipped with a stirrer, distilling head and nitrogen inlet was charged with 9.7 grams (0.5 mole) of dimethyl terephthalate (can be abbreviated DMT), 11.5 grams (0.08 mole) of 1,4-cyclohexanedimethanol (70 percent trans), 22.5 grams (.008 mole) of poly(tetramethylene glycol) (molecular weight 2800) and 0.30 ml. of a 28.5 percent solution of titanium tetraisopropoxide in butanol. The reaction vessel was swept with nitrogen, stirred and heated to 200° C. Methanol was rapidly evolved and when 2 ml. had been collected (65 percent of theory), the temperature of the reaction mass was raised over a twenty-five minute period to 278° C. A vacuum was then applied rapidly so that a pressure of 0.3 mm. of mercury was obtained in eight minutes. The molten mass was stirred at 0.15 to 0.3 mm. and 278± 2°C. for sixty minutes. During this time the viscosity of the melt increased rapidly. At the end of the polymerization, the polymer was cooled under vacuum and removed from the flask. It was a hard, rubbery mass with an inherent viscosity of 1.38 and containing 64.2 percent by weight of poly(tetramethylene glycol) in the final polymer. This material was forced under nitrogen at 270° C. by a heated screw through a 10 hole spinerette having holes 0.85 mm. in diameter to form continuous filaments of 250 to 350 denier. These filaments were immediately passed through a water bath at 25° C. then through a set of pull-out rolls and finally collected on a yarn package. The filaments were then passed through super-heated steam at 200° C. to stabilize the fiber and during this treatment the fiber was allowed to relax or was drawn in order to obtain desired physical properties. The extent of draw may range from 20 percent of the original length to 10 percent relaxation over its original length.

The final fiber had the following properties:

Tenacity, g./d. _____ 0.5–0.6
Elongation (by hand), percent _____ 400–450
Elastic modulus (at 30 percent extension),
  g./d. _____ 0.10 to 0.12
Elastic modulus (at 100 percent extension),
  g./d. _____ 0.085 to 0.10
Elastic recovery (from 200 percent extension), percent _____ 94 to 96
Sticking temperature, ° C. _____ 180 to 200
Crystalline melting temperature, ° C. _____ 245 to 250

The polymer can also be extruded through a narrow slit to form clear elastic films. Such a film has the following properties:

Tensile strength, p.s.i. _____ 3,200
Elongation at break, percent _____ 825
Tensile modulus (at 300 percent elongation),
  p.s.i. _____ 2,420
Tensile modulus (at 400 percent elongation),
  p.s.i. _____ 2,510

While the elastomeric filaments, fibers and yarns of our invention may be produced by various well-known methods of melt spinning, the process outlined in this example is preferred. This process is described and claimed in the copending application of Emmet V. Martin Serial No. 86,511, filed February 1, 1961, entitled "Process and Apparatus for Orienting Yarn."

EXAMPLE 2

The procedure of Example 1 was repeated except that 9.2 grams (.0475 mole) of dimethyl terephthalate (DMT) and 0.79 gram (.0025 mole) of dibutyl sebacate was used in place of the 9.7 grams of dimethyl terephthalate of Example 1. The final polymer had an inherent viscosity of 1.42 and a crystalline melting point of 240 to 250° C. Fibers having excellent elastomeric properties, good tensile strength and high elastic recovery were spun from this composition, these properties being given in Table 2 below.

EXAMPLE 3

The procedure of Example 1 was repeated except that 13.9 grams (0.05 mole) of dibutyl terephthalate was used in place of the dimethyl terephthalate. In this case butanol is evolved during the ester interchange and the temperature is increased when 5 ml. (67 percent of theory) of distillate is collected. The final polymer had an inherent viscosity of 1.37 and a crystalline melting point of 240 to 250° C. Filaments spun from this composition had excellent elastomeric properties, good tensile strength and high elastic recovery. See Table 1 below.

EXAMPLE 4

A flask was charged with 20.4 grams (0.04875 mole) of dibutyl 4,4'-sulfonyldibenzoate, 0.86 ml. (0.00256 mole) of dibutyl sebacate, 21.2 grams (0.147 mole) of 1,4-cyclohexanedimethanol (70 percent trans), 35 grams of poly(tetramethylene glycol) (molecular weight 2800, .0125 mole) and 0.3 ml. of a 42 percent solution of $Mg[HTi(OC_4H_9)_6]_2$ in n-butanol. The flask was swept with nitrogen, and the contents stirred and heated to 200° C. The alcoholysis reaction proceeded rapidly and the butanol which distills was collected. When 6 ml. (70 percent of theory) was collected, the temperature was increased over a one-hour period to 285° C. A vacuum was then rapidly applied, and the molten polymer stirred at 285±5° C. and 0.2 to 0.1 mm. pressure for one hour. The final polymer containing 64.9 percent by weight of the polyether-glycol had an inherent viscosity of 1.33 and a crystalline melting point of 252 to 260° C. This composition was useful for the production of filaments, films and other shaped objects having good elastomeric properties.

EXAMPLE 5

A flask was charged with 24.4 grams (0.1 mole) of dimethyl 2,6-naphthalenedicarboxylate, 56.0 grams (0.2 mole) of poly(tetramethylene glycol), molecular weight 2800, 25.9 grams of 1,4-cyclohexanedimethanol (70 percent trans) and 0.6 ml. of a 42 percent solution of $Mg[HTi(OC_4H_9)_6]_2$ in n-butanol. The flask was swept with nitrogen, and the contents stirred and heated to 200° C. Alcoholysis proceeded rapidly, and the methanol which distilled was condensed and collected. When 6 ml. had distilled (70 percent of theory), the temperature was raised over a one-hour period to 290° C. A vacuum was then applied and the molten mass stirred at 290° C. and 0.3 to 0.2 mm. of pressure for one hour. The final polymer which contains 67.4 percent by weight of the polyether-glycol was cooled under vacuum and removed from the flask. It had an inherent viscosity of 1.39 and a crystalline melting point of 190 to 210° C. The polymer was then spun into fibers which had an elongation of greater than 400 percent.

EXAMPLE 6

The procedure of Example 1 was repeated except that the 70 percent trans-1,4-cyclohexanedimethanol was replaced with 100 percent cis-1,4-cyclohexanedimethanol. The final polymer had an inherent viscosity of 1.39 and a crystalline melting point of 215 to 223° C. The polymer was melt spun into elastomeric yarns having properties essentially the same as those described in Example 1, except that the sticking temperature was 160 to 170° C.

EXAMPLE 7

A reaction flask equipped with stirrer, nitrogen inlet, and a distilling head was charged with 7.15 grams (0.0416 mole) of trans-1,4-cyclohexanedicarboxylic acid, 11.98 grams (0.0832 mole) of trans-1,4-cyclohexanedimethanol, 17.5 grams (0.00624 mole) of poly(tetramethylene glycol) of molecular weight 2800, and 0.3 ml. of a 42 percent solution of $Mg[HTi(OC_4H_9)_6]_2$ in n-butanol. The reaction flask was swept with nitrogen, the stirrer started and the flask heated to 200° C. The reaction temperature was maintained at 200° C. for ninety minutes and then raised to 278° C. over a thirty-minute period. At 278° C., a vacuum was applied and the reaction mass stirred at 278° C. and 0.07 mm. pressure for seventy minutes. After this time, the polymer was cooled under vacuum and removed from the flask. The translucent rubbery mass which contained 62 percent by weight of poly(tetramethylene glycol), was found to have an inherent viscosity of 1.57 and a crystalline melting point of 155 to 165° C.

EXAMPLE 8

The procedure of Example 7 was repeated using 8.32 grams (0.0416 mole) of dimethyl trans-1,4-cyclohexanedicarboxylate. The final product had an inherent viscosity of 1.48 but was otherwise identical to that of Example 7.

EXAMPLE 9

A flask equipped with stirrer, nitrogen inlet and distillation take off was charged with 27.0 grams (0.10 mole) of the dimethyl ester of 4,4'-diphenic acid, 21.6 grams (0.15 mole) of 1,4-cyclohexanedimethanol (70 percent trans), 55.0 grams (0.025 mole) of poly(tetramethylene glycol) of molecular weight 2200 and 1.2 ml. of a 21 percent solution of $Mg[HTi(OC_4H_9)_6]_2$ in n-butanol. Diphenic acid is also known as biphenyldicarboxylic acid.

The reaction mixture was stirred and heated at 200° C. for one hour. The temperature was then raised to 285° C. and at this temperature the pressure was reduced to less than 0.20 mm. of pressure. The polymer was stirred at 285° C. and 0.1 to 0.2 mm. pressure for sixty minutes. After cooling, the polymer which contained 63.8 percent by weight of poly(tetramethylene glycol) was found to have an inherent viscosity of 1.47 and a crystalline melting point of 270 to 280° C.

EXAMPLE 10

A flask equipped with stirrer, nitrogen inlet and distillation take-off was charged with 19 grams (0.097 mole) of dimethyl terephthalate, 7.6 grams (.0048 mole) of methyl 4-hydroxymethylcyclohexanecarboxylate, 32 grams (0.156 mole) of 1,4-cyclohexanedimethanol (70 percent trans) containing 30 percent methanol, 45 grams of poly(tetramethylene glycol) (molecular weight 2900, .0156 mole), 0.4 gram of 4,4'-dioctyldiphenylamine and 1.2 ml. of a 21 percent solution of $Mg[HTi(OC_4H_9)_6]_2$ in n-butanol.

The preparative procedure of Example 1 was followed and the final polymer, which contained 63.9 percent by weight of poly(tetramethyl glycol), had a viscosity of 1.44 and a crystalline melting point of 240 to 250° C. This material on spinning produced excellent elastomeric fibers.

The preceding examples have described the preparation of the elastomeric polymer by a batch, melt phase polymerization. Obviously, other methods are available whereby these compositons can be prepared. One such method uses the solid phase polymerization technique in which a low molecular weight polymer is polymerized to a higher molecular weight by heating under vacuum at a temperature below its melting point. The following example illustrates the application of this technique to the preparation of the polyesters of this invention.

EXAMPLE 11

A test tube was charged with 1.9 grams (0.00975 mole) of dimethyl terephthalate, 2.55 grams (.0124 mole) of 1,4-cyclohexanedimethanol (70 percent trans) containing 30 percent methanol, 4.50 grams of poly(tetramethylene glycol) (molecular weight 3000, .0015 mole), 0.04 gram of 4,4'-dioctyldiphenylamine and 4 drops of a 21 percent solution of $Mg[HTi(OC_4H_9)_6]_2$ in butanol.

The tube was flushed thoroughly with nitrogen, and placed in an aluminum block heated to 200° C. The reaction was permitted to proceed under these conditions for 20 to 30 minutes and then the tube was transferred to a second block heated to 280° C. The internal temperature of the reaction mass rose rapidly, and in approximately 30 minutes reached 270° C. A vacuum was applied slowly so that the contents of the tube did not "bump" badly. The reaction was heated for ten minutes at a pressure of 0.1 mm. of mercury or less. After cooling, the low molecular weight polymer (prepolymer) was removed from the tube and chopped. This material had an inherent viscosity of 0.90.

The chopped prepolymer was heated further at 200° C., for three hours at 0.08 mm. pressure. The final polymer now had an inherent viscosity of 1.90 to 2.0 and a crystalline melting point of 250 to 260° C.

As indicated in the general description of our invention above, the highly elastic polyesters of our invention are distinguished by the fact that filaments, fibers, and yarns produced therefrom possess an unusual combination of physical properties not heretofore attainable in any known elastomeric polyester filaments or fibers. For example, they are characterized by the combination of high elongation and good elastic recovery, high crystalline melting point, high intrinsic viscosity (I.V.) and relatively high tenacity or tensile strength as compared to other elastomeric fibers produced from other polyesters, such, for example, as those derived from ethylene glycol and polyethylene glycol. In fact, one of the unusual and unexpected properties of the filaments, fibers, and yarns or our invention is the fact that they not only possess excellent elastic properties, but also have anywhere from about four to as much as seven or eight times or more the tensile strength of the nearest comparable elastomeric polyester fibers of the prior art. This unusual combination of physical properties will be evident from the tables which follow.

Following the procedure of Example 1, a large number of additional elastomeric polyesters were prepared from dimethyl terephthalate, 1,4-cyclohexanedimethanol and varying amounts of poly(tetramethylene glycol) of different molecular weights. Some of these are summarized in the following Table 1.

TABLE 1.—YARN PROPERTIES OF ELASTOMERIC POLYESTERS

| PTMG, viz. Poly(tetramethylene glycol) | | | Polyester Properties | | Polyester Yarn Properties | | | | | | | |
|---|---|---|---|---|---|---|---|---|---|---|---|---|
| Molec. Wt. | Percent Modification | | Inherent Viscosity | Crystalline, M.P. | Tenacity, g./d. | Elongation, percent | | Modulus at— | | Elastic Recovery, Percent [4] | Flow Point, ° C. | Sticking Temp., ° C. |
| | Mole percent [1] | Weight percent [2] | | | | Machine | Hand | 30% Extension | 100% Extension | | | |
| 2,800 | 15 | 62.5 | 1.70 | 245–255 | 0.48 | 764 | 535 | .072 | .074 | 95.0 | 180 | 158–165 |
| 2,900 | 15 | 63.2 | 1.38 | 245–255 | 0.45 | 508 | 417 | 0.078 | .106 | 94 | 180 | 160 |
| 2,200 | 19 | 64.1 | 1.56 | 242–250 | 0.51 | 676 | 451 | .093 | .087 | 94 | 180 | ------- |
| 2,200 | 23 | 67.7 | 1.50 | 225–230 | 0.41 | 548 | 367 | .051 | .055 | 96 | 158 | ------- |
| 2,200 | 15 | 56.7 | 1.40 | 250–255 | 0.41 | 602 | 466 | .120 | .109 | 89 | 194 | ------- |
| 1,100 | 20 | 47.4 | 1.33 | 230–235 | .39 | 476 | 406 | .263 | .161 | 72 | 200 | ------- |
| 2,800 | 30 | 78.2 | 1.40 | 215–225 | .56 | 819 | ------- | 0.07 | 0.05 | 96.5 | 127 | 116–137 |
| 2,600 | 15 | 60.6 | 1.55 | 250–255 | .52 | 584 | 399 | .102 | .099 | 90.9 | ------- | ------- |
| 3,000 | 16 | 65.7 | 1.69 | 238–245 | .47 | 710 | 519 | .079 | .073 | 95.0 | ------- | 180–195 |
| 2,800 | 20 | 69.5 | 1.38 | 240–245 | .41 | 501 | ------- | .16 | .11 | 97 | 166 | 158–162 |
| 2,800 | 15 | [3] 62.5 | 1.43 | 230–236 | .46 | 705 | 530 | .080 | .082 | 96 | 172 | 150–155 |

[1] The mole percent of PTMG is defined as the molar percentage of the total amount of diol component which total consists of PTMG+CHDM.
[2] The weight percent of poly(tetramethylene glycol) is defined as the weight percent of poly(tetramethylene glycol) in the final polyester.
[3] The CHDM, viz., 1,4-cyclohexanedimethanol, contained 50 percent of the trans isomer. All other examples were prepared from CHDM containing 70 percent trans isomer and 30 percent cis isomer.
[4] The elastic recovery is measured from an elongation of 200 percent.

Following the procedure of Example 2, a number of sebacate-modified elastomeric polyesters were also prepared. The compositions and fiber properties are tabulated in Table 2:

TABLE 2.—FIBER PROPERTIES OF SEBACATE MODIFIED ELASTOMERIC POLYESTERS

| PTMG | | | Mole Percent Sebacate Based on DMT | Inherent Viscosity | Crystalline, M.P. | Yarn Properties | | | | | | |
|---|---|---|---|---|---|---|---|---|---|---|---|---|
| Molec. Wt. | Percent Modification | | | | | Tenacity, g./d. | Elongation, Percent | | Modulus at— | | Elastic Recovery, Percent [3] | Flow Point, °C. | Sticking Temp., °C. |
| | Mole Percent [1] | Weight Percent [1] | | | | | Machine | Hand | 30% Extension | 100% Extension | | | |
| 2,800 | 17 | 65.6 | 2.5 | 1.35 | 242–252 | .64 | 620 | -------- | .18 | .18 | 94 | 178 | 152–156 |
| 2,800 | 15 | 62.4 | 5.0 | 1.37 | 240–250 | .62 | 433 | -------- | .27 | .18 | 96 | 188 | 180 |
| 2,800 | 10 | 51.5 | 10.0 | 1.31 | 236–247 | .69 | 221 | -------- | .41 | .30 | 96 | -------- | 160 |

[1] The mole percent of PTMG is defined as the molecular percentage of the total amount of diol component which total consists of PTMG+CHDM.

[2] The weight percent of PTMG is defined as the weight percent of PTMG in the final polymer.

[3] The elastic recovery is measured from an elongation of 200 percent.

In addition to the unusual combination of physical properties obtainable in filaments, fibers and yarns produced from the elastomeric polyesters of our invention, as described above, such yarns are also characterized by the fact that they have high hydrolytic stability. Consequently, garments fabricated from yarns produced from compositions of our invention are capable of being subjected to the most extreme of laundering conditions with no deleterious effects. This contrasts sharply with the behavior of polyester elastomeric yarns of the prior art as described in the aforementioned Textile Industries' article of August 1961, referred to above. For example, yarn specimens produced according to the procedure described above in Example 1 were subjected to a two-hour treatment with 10 percent aqueous sodium hydroxide at 50° C. with only a 1 percent loss in original tenacity and a 5 percent loss in original elongation. Even boiling these fibers for two hours in 2 percent aqueous sodium carbonate brought about only a 7 percent decrease in the original tenacity of the fibers.

In order to illustrate further the resistance of the fibers to hydrolysis, the elastomeric fibers of Example 1 were subjected to superheated (125° C.) steam for various lengths of time, and the fiber properties subsequently determined. The table below summarizes the data obtained.

TABLE 3.—FIBER PROPERTIES OF STEAMED ELASTOMERIC YARNS

| Time of Steam Treatment | Fiber Tenacity, g./d. | Elongation, Percent (Hand Test) | Elastic Recovery, Percent | Modulus at— | |
|---|---|---|---|---|---|
| | | | | 30% Extension | 100% Extension |
| None | .443 | 390 | 94 | .109 | .083 |
| ½ Hr | .406 | 380 | 95.7 | .096 | .077 |
| 1 Hr | .414 | 414 | 94.8 | .100 | .077 |

It is readily seen that this very severe treatment of the fiber has brought about no deleterious change in fiber properties.

The polyester composition prepared according to the procedure of Example 1 was subjected to superheated steam (125° C.) for various periods of time and the inherent viscosity of the steamed polymer determined. The original viscosity of the polymer was 1.43. Samples steamed 1 hr., 2 hr. and 6 hr. were all found to have viscosities of 1.44. Thus no detectable viscosity degradation was obtained under these severe hydrolytic conditions.

A second property of extreme importance in elastomeric yarns is stress relaxation. As also stated in the above-mentioned Textile Industries' article of August 1961, a low stress relaxation is important, otherwise elastic garments such as foundation garments will grow larger during a day's wear, i.e., they will exert less and less pressure upon the wearer's body the longer they are worn.

The filters, yarns and filaments of our polyester composition show a low stress relaxation or, as it is commonly expressed, the filaments retain a high percentage of their original stress after a long period of extension. As the test is usually run, the fiber is stretched, held to a fixed percentage elongation and the stress required to maintain the fiber at that elongation is measured by means of a spring balance. The stress remaining at the end of the test period is expressed as a percentage of the stress originally necessary to draw the fiber to the elongation.

The fibers prepared from our elastomeric polyesters show a stress relaxation behavior very similar to rubber or to the spandex elastomeric fibers which are commercially available. The following table illustrates this using commercially available rubber fibers and spandex fibers.

TABLE 4

| Fiber Loaded to an Extension of— | Percent Stress Retained After 8 Hours | | |
|---|---|---|---|
| | Fiber of Example 1 | Rubber | Spandex Fiber |
| 100% | 75–76 | 80 | 75–79 |
| 200% | 70–75 | 78 | 70–76 |

*Raising the inherent viscosity of the polymer*

In order to obtain the optimum combination of fiber properties in the elastomeric polyesters of the present invention, it is desirable to have as high an inherent viscosity in the fiber as possible. Preferably, the I.V. of the polyester in fiber-form is in the range of 1.4 to 2.8 or higher. This can be achieved by forming fibers from a polyester which has an I. V. of 1.5 to 3.2 or higher. An especially advantageous method of obtaining the desired viscosities is described in our co-pending U.S. application Serial No. 151,557, filed November 10, 1961. This method depends upon the use of certain aromatic amines as modifiers in the process for preparing the basic elastomeric polyester. The amines are used in an amount in the range .01 to 5 percent by weight based on the weight of the final polyester. Surprisingly, this small amount of amine modifier is capable of effecting a substantial increase in the polyester's inherent viscosity. In general, the desirable amines are aromatic secondary or tertiary amines of sufficiently high boiling point that they do not distill from the reaction mixture during the early stages of the preparation of the polyester. Of particular interest in this respect are 4,4'-dioctyldiphenylamine, N-ethyl 4,4'-dioctyldiphenylamine and N,N'-di-α-naphthyl-p-phenylenediamine and N,N'-diethyl N,N'-di-α-naphthyl-p-phenylenediamine. See Examples 9 and 10 above. In order to obtain this improvement in viscosity, it is not essential that these amine modifiers be present in the final polyester; it is only necessary that they be present during at least part of the final stage of the preparation of the polyester, e.g., while under a vacuum. Reference is also directed to our copending U.S. application Serial No. 186,196, filed on April 9, 1962, concerning the process of improving the viscosity of polyesters TPA and CHDM modified with poly(tetramethylene glycol) by employing during the preparation of the polyester, as a viscosity improver, thiodipropionic acid, thiodiglycolic acid and thiodibutyric acid or their esters or polyesters.

EXAMPLE 12

The procedure of Example 1 was repeated except that 0.34 gram of N,N'-di-α-naphthyl-p-phenylenediamine was included with the other reagents. This corresponds to 1 percent by weight of the final polymer. The final polymer was found to have an inherent viscosity of 1.67, a significant improvement over the polymer of Example 1 which had an inherent viscosity of 1.38.

Stabilization of the polymer

It is desirable for elastomeric yarns to possess a high thermal stability. This is necessary so that garments containing the elastomeric yarns can be laundered, machine dried and ironed with no special precautions and yet suffer no loss of properties. As described in our copending application U.S. Serial No. 166,155, filed Jan. 15, 1962, we have found that such thermal stability is imparted to the elastomeric yarns by incorporating therein small (0.01 to 5 percent by weight) amounts of certain 2,4,6-trialkylated phenols. These may be used alone but unusually high thermal stabilities are obtained if the phenol is used in combination with esters or polyesters derived from thiodipropionic acid, such as dilauryl thiodipropionate or a polyester prepared from thiodipropionic acid and ethylene glycol.

The phenols of particular interest are 2,6-di-n-dodecyl-4-methylphenol, 2,6 - di(1-methylheptadecyl)-4-methylphenol and the like. Fibers containing such phenolic stabilizers have the added advantage that they do not develop a yellow color on exposure for extended periods of time to light and the atmosphere. A fiber which does show this property (termed gas fading or yellowing) suffers from a very serious disadvantage in the textile industry.

The introduction of the stabilizer composition into the fiber can be accomplished most simply by introducing the reagents into the reaction vessel together with the other reagents. A second method is to add the stabilizers to the elastomeric polymer at the completion of polymerization. A third would involve adding the stabilizers immediately before spinning or extruding. This addition may be accomplished by dusting the stabilizers on the polymer or by mixing a "master batch" of stabilizer into the regular polymer. This master batch is prepared by milling a high concentration of the stabilizer into a low melting elastomeric composition. The master batch is then chopped, blended in the proper proportions with the base polymer, and the blend spun, molded or extruded.

In addition pigments and other coloring materials, delustering agents and anti-sticking agents may be added to the polymer during synthesis or prior to shaping into final form. Such may be added by incorporating said materials in a master batch and adding to the polymer prior to shaping portions of the master batch.

EXAMPLE 13

A "master batch" is prepared as follows:
The polymer which contains 1 mol of dimethyl terephthalate, 0.7 mole of 1,4-cyclohexanedimethanol and 0.3 mole of poly(tetramethylene glycol) (molecular weight 2800) is used as the dispersing medium for the master batch. Two hundred grams of this polymer was placed on the rolls of a small rubber rolling mill, the rolls being maintained at 150° C. When the polymer had become properly distributed as a band on the rolls, 12.5 grams of dilauryl thiodipropionate, 50 grams of rutile titanium dioxide and 7.5 grams of 2,6-di(1-methylheptadecyl)-p-cresol was added in increments. The band was stripped from the rolls, broken and replaced on the rolls until thorough mixing was insured. It was then removed and broken into small pieces. This material was blended with 2250 grams of the polymer described in Example 1. The final mixture was spun into fibers which contained 2 percent titanium dioxide, 0.5 percent by weight diluaryl thiodipropionate and 0.3 percent 2,6-di(1-methylheptadecyl)-p-cresol.

The fibers from this spinning were exposed to the air at 125° C. and the fiber properties determined from samples withdrawn periodically. The fibers stabilized in the manner described above still retained 70 percent of their original tenacity and 72 percent of their original elongation after 303 hours. As showing the efficacy of employing stabilizers, when no stabilizer was added to the polymer before spinning, the final fibers retained less than 25 percent of their original physical properties after 15 hours heating in air at 125° C.

In addition, the stabilized fibers were exposed in a fume or gas-yellowing test according to Procedure No. 23–1957 of the American Association of Textile Chemists and Colorists. No yellow color developed after three cycles of this test which is considered to be equivalent to 18 months of wear. Such a behavior is given a rating of 5 in this test—the highest rating which it is possible to assign.

The following examples numbered 14A to 20B are based upon polyesters prepared according to the following procedures designated as Methods A, B, and C.

These procedures are outlined below without specifically identifying the molecular weight distribution of the poly(tetramethylene glycol) and serve only to identify the preparative procedures used in this invention.

*Method A—Batch process.*—A 250 ml. flask equipped with stirrer, nitrogen inlet and distillation head was charged with 9.6 grams (.0344 mole) of dibutyl terephthalate, 8.4 grams (.0583 mole) of trans-1,4-cyclohexanedimethanol, 32.1 grams (.0107 mole) of poly(tetramethylene glycol) with a number average molecular weight of 3000, 12 grams of Aroclor 5442 (a chlorinated polyphenyl having a specific gravity between 1.432 and 1.447 used to enhance the process without taking part in the reaction as described in another copending U.S. application), 0.4 gram of diluaryl thiodipropionate and 0.6 ml. of a 21 percent solution of $Mg[HTi(OC_4H_9)_6]_2$ in n-butanol.

The mixture was stirred and heated under nitrogen to a temperature of 200° C. During the first, or alcoholysis stage of the reaction, butanol is evolved and collected. After sixty minutes, the reaction temperature was increased over a forty minute period to 280° C. A vacuum was then rapidly applied and within five minutes, the pressure was reduced to less than 0.15 mm. of mercury. The residual polymer was stirred at this temperature and pressure for sixty minutes during which time the viscosity of the melt increased rapidly until the polymer was wrapping about the stirrer in a ball. The product from this second, or melt phase, stage of the polymer preparation was cooled, removed from the flask and found to have an inherent viscosity of 2.14 and a crystalline melting point of 220 to 225° C. The final polymer contained 80 weight percent of poly(tetramethylene glycol).

*Method B—Prepolymer and solid phase polymerization.*—A test tube was charged with 1.9 grams (0.00975 mole) of dimethyl terephthalate, 2.55 grams (0.0124 mole) of 1,4-cyclohexanedimethanol (70 percent trans) containing 30 percent methanol, 4.50 grams of poly(tetramethylene glycol) (molecular weight 3000, .0015 mole), 0.04 gram of dilauryl thiodipropionate and 4 drops of a 21 percent solution of $Mg[HTi(OC_4H_9)_6]_2$ in n-butanol.

The tube was flushed thoroughly with nitrogen and placed in an aluminum block heated to 200° C. The reaction was permitted to proceed under these conditions for 20 to 30 minutes and then the tube was transferred to a second block heated to 280° C. The internal temperature of the reaction mass rose rapidly, and in approximately thirty minutes reached 270° C. A vacuum was applied slowly so that the contents of the tube did not "bump" badly. The reaction was heated for ten minutes at a pressure of 0.1 mm. of mercury or less. After cooling, the low molecular weight polymer (prepolymer) was removed from the tube and chopped or otherwise comminuted into rough cubes of approximately ⅛ to ¼ inch on a side. This material had an inherent viscosity of 0.90 and on heating at 0.08 mm. of mercury for 3 hours at 200° C., the viscosity increased to 1.97. The final polymer contained 65 percent by weight of the poly(ether glycol), PTMG.

*Method C—Continuous melt phase polymerization.*—The drawing of the figure designated FIG. 1 of our copending application Serial No. 166,155 is a simplified illustration in the nature of a flow sheet showing schematically one form of apparatus in which the polymers of our invention can be prepared. The reagents were mixed batchwise, each batch consisting of similar proportions of reactants, as, for example, 2680 grams (13.81 moles) of dimethyl terephthalate, 9750 grams poly(tetramethylene glycol) (3.61 moles, 2700 molecular weight), 3460 grams (24.0 moles) of trans-1,4-cyclohexanedimethanol, 114 grams of a 21 percent solution of $Mg[HTi(OC_4H_9)_6]_2$ in n-butanol, and 390 grams (3 percent by weight of the final polymer) of dilauryl thiodipropionate. This mixture was melted by heating to 140° C., stirred and fed at a rate of 17 pounds per hour into a column equipped with plates which serves as a prepolymerizer. The prepolymerizer column was heated to 220° C. by means of hot oil introduced into an external jacket and the pressure in the column generated by the evolved methanol was regulated by a pressure regulator at about 10 p.s.i. (the term p.s.i. is herein used to indicate pounds per square inch gauge). The molten reagents covered the plates and flowed down the column by passing through overflow pipes from each plate onto the plate beneath. At the bottom of the prepolymerizer, the reaction product was delivered by a pump through a heated tube to a polymerizer column in which the final polymer was formed. This column which serves as a reactor was heated to 278° C. by a jacketed hot oil system and maintained under vacuum by two independent vacuum systems operating through the manifolds leading from the column. The column was divided into two sections separated by a liquid seal in which molten polymer served as the liquid. The upper section above the liquid seal was maintained at a pressure of 1 to 2 mm. of mercury and the lower section was maintained at a pressure of 0.2 mm. of mercury. The low molecular weight material delivered to this polymerizer column was distributed through the upper section so as to expose the maximum surface to the vacuum, and then the material passed through the liquid seal into the lower section. In this lower section, the polymer flowed over a series of sloping heated baffle plates which slope in alternate directions as it descended through the column. During the descent, the polymer increased rapidly in viscosity.

At the bottom of the column a pump was used to remove the polymer from the column and feed it into a quenching bath of water.

The final polymer had an inherent viscosity as shown in Table 5 (1.69 to 1.83).

TABLE 5

| Example | PTMG I.V. | PTMG, Molecular Weight | Ratio PTMG I.V.×10⁴, Mol. Wt. | Wt. percent PTMG in Polymer | Polyester I.V. | Permanent Set, percent 1 Min. | Permanent Set, percent 60 Min. | Preparative Method |
|---|---|---|---|---|---|---|---|---|
| 14A | 0.35 | 2,600 | 1.35 | 80 | 1.80 | 104 | 53 | C |
| 14B | 0.31 | 2,700 | 1.15 | 80 | 1.83 | 58 | 36 | C |
| 14C | 0.29 | 2,600 | 1.08 | 80 | 1.79 | 47 | 29 | C |
| 15A | 0.38 | 2,900 | 1.31 | 77.5 | 1.72 | 81 | 50 | C |
| 15B | 0.29 | 2,600 | 1.11 | 77.5 | 1.80 | 40 | 27 | C |
| 16A | 0.35 | 2,600 | 1.35 | 75 | 1.69 | 84 | 50 | C |
| 16B | 0.33 | 2,700 | 1.22 | 75 | 1.73 | 38.5 | 27 | C |
| 16C | 0.29 | 2,600 | 1.11 | 75 | 1.77 | 34 | 24 | C |
| 17A | 0.45 | 3,400 | 1.33 | 80 | 1.83 | 106 | 78 | A |
| 17B | 0.33 | 3,300 | 1.00 | 80 | 2.12 | 25 | 22 | A |
| 18A | 0.32 | 2,300 | 1.40 | 75 | 2.43 | 67 | 37 | B |
| 18B | 0.26 | 2,300 | 1.12 | 75 | 2.57 | 25 | 18 | B |
| 19A | 0.31 | 2,300 | 1.34 | 66 | 1.72 | 75 | 42 | C |
| 19B | 0.25 | 2,300 | 1.10 | 66 | 1.75 | 34 | 25 | C |
| 20A | 0.48 | 3,700 | 1.30 | 82.5 | 1.83 | 97 | 48 | A |
| 20B | 0.39 | 3,600 | 1.08 | 82.5 | 1.88 | 42 | 33 | A |

The data presented in the accompanying Table 5 are arranged in groups, each group consisting of polyesters containing the same weight percent poly(tetramethylene glycol) but differing in the molecular weight distribution of the poly(tetramethylene glycol). For instance, consider Example 14. These three polymers were prepared by the continuous melt phase process and contain 80 weight percent poly(tetramethylene glycol) of essentially the same molecular weight. The poly(tetramethylene glycol) differs in its molecular weight distribution, that of Example 14A having a broader distribution than that of either Examples 14B or 14C. It can also be seen that the permanent set data on the fibers of Examples 14B or 14C are much better than that of the fibers of Example 14A, and that the fiber properties of Example 14C are better than that of Example 14B.

An examination of the remaining data in Table 5 shows that in every case the polymers containing poly(tetramethylene glycol) with a distribution less than that indicated by the ratio of 1.25 has much better fiber permanent set data than the polymers prepared from polyether with a broad molecular weight distribution (ratio greater than 1.25). It is desirable that the permanent set of the elastomeric fibers be 40 percent or less at the one minute measurement and 30 percent or less at the 60 minute measurement.

In the textile industry elastomeric yarns are widely used in foundation garments and bathing suits, in stocking tops, suspenders, garters, dresses, blouses, etc. During the normal course of a day's wear, the elastomeric yarns of these garments are subjected to elongations of 25 percent to 200 percent for periods as long as 15 hours. Should the elastic yarns possess a high degree of permanent set after this wearing, the garments will not return to their original dimensions but will appear to have grown in size. It can be seen that a low fiber permanent set is necessary for satisfactory behavior of the garment containing the fiber.

The following Examples 21 to 27 will serve to further illustrate the invention using PTMG having a molecular weight ranging up to 4500 and constituting up to 85 percent by weight of the elastomeric polyester.

EXAMPLE 21

A vessel equipped with a stirrer, distilling head and nitrogen inlet was charged with 5.75 grams (0.0125 mole) of dibutyl terephthalate, 4.76 grams (0.0331 mole) of trans-1,4-cyclohexanedimethanol, 24.9 grams (0.0083 mole) of poly(tetramethylene glycol) of molecular weight 3000, 12 grams of Aroclor 5442, (a chlorinated polyphenyl having a specific gravity between 1.432 and 1.447 used to enhance the process without taking part in the reaction as described in another copending U.S. application), 0.6 gram of dilauryl 3,3'-thiodipropionate and 0.6 ml. of a 21 percent solution of Mg[HTi(OC$_4$H$_9$)$_6$]$_2$ in n-butanol. The reaction vessel was swept with nitrogen, stirred and heated to 200° C. to effect the alcoholysis reaction. After sixty minutes, the alcoholysis was essentially complete and the temperature of the reaction was raised over a thirty minute period to 275° C. A vacuum was then applied rapidly so that a pressure of 0.3 mm. of mercury was obtained in eight minutes. The molten mass was stirred at 0.15 to 0.3 mm. and 275° C. for ninety minutes. At the end of the reaction, the polymer was cooled, removed from the flask and ground into a coarse powder. This powder was extracted with ether to remove residual Aroclor 5442 and dried. The final dried polymer had an inherent viscosity in 60:40 phenol:tetrachloroethane of 2.56 and contained 85 percent by weight of poly(tetramethylene glycol).

Using this procedure a number of different elastomer compositions were prepared and submitted for melt spinning or film pressing. The following Table 6 summarizes the compositions prepared and their fiber or film properties:

TABLE 6

| Example | Molecular Weight of PTMG | Weight Percent PTMG | Percent Trans Isomer in 1,4-Cyclohexane-dimethanol | Film or Yarn I.V. | Tenacity, g./d. | Elongation, Percent | Elastic Recovery from 400% Elongation | Secant Modulus at 100% Elongation, g./d. | Fiber Sticking Temp., °C. |
|---|---|---|---|---|---|---|---|---|---|
| 22 | 2,300 | 81 | 95 | 1.78 | 0.30 | 694 | 94.8 | .019 | 132-160 |
| 23 | 2,700 | 81 | 95 | 1.59 | 0.27 | 665 | 93.7 | .021 | 146-166 |
| 24 | 2,900 | 82 | 95 | 1.74 | 0.35 | 715 | 95.0 | .030 | |
| 25 | 2,800 | 82.6 | 95 | 1.83 | 0.34 | 615 | 96.2 | .014 | |
| 26 | 4,500 | 85 | 67 | 1.97 | 0.35 | 813 | 95.1 | .014 | |
| 27 | 3,400 | 82.5 | 95 | 1.63 | 0.27 | 819 | 94.3 | .022 | |
| 28 | 2,300 | 77 | 95 | 2.11 | 0.55 | 545 | 95.1 | .068 | 116-125 |
| 29 | 2,100 | 77 | 95 | 2.12 | 0.52 | 505 | 95.5 | .067 | 110-120 |
| 30 [1] | 3,000 | 85 | 95 | 2.22 | 0.30 | 900 | 93.5 | 0.015 | |
| 31 [1] | 3,000 | 80 | 95 | 2.50 | 0.21 | 600 | 95.0 | 0.023 | |
| 32 [1] | 3,000 | 80 | 95 | 2.71 | 0.28 | 725 | 95.7 | 0.024 | |
| 33 [1] | 3,000 | 80 | 95 | 1.85 | 0.20 | 700 | 94.5 | 0.020 | |

[1] Properties measured on a pressed film.

The elastomeric polyester filaments, fibers and yarns of this invention are characterized by a high melting point, a high degree of elongation and recovery from stretch, and a high strength. Fabrics made from these yarns will, therefore, be capable of an extension from two to five times their original length and yet may be treated in much the same way as a normal synthetic fabric. That is, they may be washed and dried in commercial or home automatic equipment and they may be dry cleaned and ironed without special precautions. Furthermore, the yarns of this invention are readily dyed and show a high resistance to degradation by oxidation, exposure to light, soap, human body perspiration, greases and many common chemicals.

Therefore, it is apparent that a yarn or film of the elastomeric polyesters of this invention which has high extensibility and elastic recovery, together with the other advantageous properties described above, is quite useful in the fabrication of many articles, such as brassieres, girdles, surgical hosiery, men's braces, bathing suits, stocking tops, suspenders, garters, pajamas, panties, shorts, sweaters, jackets, ski togs, dresses, blouses, skirt collars, skirts, caps and hats, gloves, tapes, ribbons, laces, belting, shoe fabrics, slip covers, upholstery, elastic bandages, hair nets, covers for jars and dishes, ropes, balls, wrappers for merchandise including foods, and many other products.

A brief discussion of a few of these uses will serve to emphasize the advantages of the elastomeric yarns of this invention. In the case of foundation garments, the fabrics woven from the subject yarns have a good elongation, a high elastic recovery and a high strength. Accordingly, fabrics will exert substantial pressure against the body of the wearer. Foundation garments can be constructed which have the desired retaining power and yet are lighter in weight and bulk and more comfortable to wear than those now available. Because of the natural resistance to greases, to alkaline soaps and detergents, and to hot water, the garments can be washed and dried in a conventional manner with no deleterious effect on their life expectancy.

The resistance of the fabrics to grease, ointments and many chemicals makes the subject elastomeric polyesters particularly useful for elastic bandages, and surgical hosiery. Again the high strength can be used to reduce the weight and bulk of the bandages and hosiery, thereby increasing the comfort of the patient.

Their use in bathing suits, slip covers and upholstery fabrics depends upon the combination of high elasticity and strength, ready dyeability, and good resistance to sunlight, soaps and detergents, etc. Thus bathing suits, slip covers, and other objects which are necessarily gaily colored, need be constructed in only a few sizes and yet, because of the high elasticity of the fabric, these few sizes can accommodate a wide variety of shapes and sizes with no alterations in the original construction. This can result in a considerable simplification in the manufacture of these products.

While the invention has been primarily described with respect to elastic yarn, it will be understood that the characteristics of the elastomeric polyesters of this invention find many uses other than in yarns. Among such uses, there may be mentioned elastic coatings for paper and the like, fabric coatings, conformable elastic films, heat-shrinkable closures for bottles and the like, safety glass interlayers, flexible tubing, dielectric for condensers, coatings for wire, and many other products.

In regard to other ways in which the present invention can be described, some of the especially preferred elastomeric polyesters of this invention which have a stress decay well below about 25 percent (percent loss in stress in a yarn after it has been elongated to 50 percent at the rate of 100 percent per minute), can be defined as comprising a segmented copolymer having an elastic recovery of at least 90 percent, said copolymer consisting essentially of a multiplicity of recurring intralinear etherester and ester units, said etherester units being represented by the following Formula I:

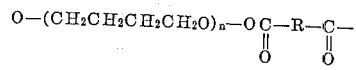

and said ester units being represented by the Formula II:

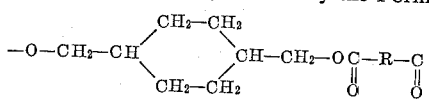

where $n$ in an integer such that

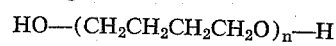

is a difunctional poly(tetramethylene glycol) having a molecular weight in the range of from about 1900 to about 5100, each R is a hydrocarbon radical remaining after removal of the carboxyl groups from a dicarboxylic acid, at least 80 mole percent of said R radicals being a divalent aromatic radical having the free valences attached directly to an aromatic ring whereby the structure represented by said Formula II is a repeating unit of a fiber-forming polyester having a melting point above 200° C. in its fiber-forming molecular weight range, said etherester and said ester units being interconnected to provide a segmented polymeric structure wherein the terminal carbonyl group of one of said etherester units is connected to the terminal oxygen atom of one of said ester units to provide an ester linkage, from about 60 to about 93 percent by weight of said segmented copolymer being provided by said etherester units and from about 40 percent to about 7 percent by weight being provided by said ester units.

An especially preferred segmented copolymer can be similarly defined wherein the R radical is a 1,4-phenylene radical derived from terephthalic acid and the range of percentages is from about 77 percent to about 93 percent by weight of said segmented copolyester being provided by said etherester units and from about 23 percent to about 7 percent being provided by said ester units. In this situation the said fiber-forming polyester has a melting point on the order of about 300° C. or higher when the 1,4-cyclohexanedimethanol is present as the trans isomer. These fiber-forming polyesters are fully disclosed in our parent application, now U.S. Patent 2,901,466, which polyesters are distinctly different from those of U.S. Patent 2,465,319.

As can be seen by the above Formulas I and II the percent by weight of PTMG, which can be called weight percent (PTMG), in the elastomeric polyester is different from the percent by weight of the etherester units, which can be called weight percent (etherester units), since the latter units contain an R radical. This can be expressed as follows in those cases where R represents the terephthalate radical:

$$\frac{\text{Wt. percent (etherester units)}}{\text{Wt. percent (PTMG)}} = \frac{\text{mol. wt. poly (tetramethylene glycol) terephalate}}{\text{mol. wt. poly (tetramethylene glycol)}}$$

The following Table 7 compares a few values for terephthalate polyesters calculated by the two methods:

TABLE 7

| Wt. Percent (PTMG in Elastomeric Polyester) | Mol. Wt. PTMG | Wt. Percent (etherester units) in Elastomeric Polyester |
|---|---|---|
| 66.3 | 800 | max. 77 |
| 64.5 | 800 | 75.0 |
| 60.2 | 800 | 70.0 |
| 77.5 | 1,800 | max. 83 |
| 75.0 | 1,800 | 80.4 |
| 70.0 | 1,800 | 75.0 |
| 65.3 | 1,800 | 70.0 |
| 85.0 | 2,200 | max. 90 |
| 75.0 | 2,200 | 79.5 |
| 70.8 | 2,200 | 75.0 |
| 66.1 | 2,200 | 70.0 |
| 90.0 | 3,900 | max. 93 |
| 75.0 | 3,900 | 77.5 |
| 72.6 | 3,900 | 75.0 |
| 92.6 | 5,100 | max. 95 |
| 90.0 | 5,100 | 92.3 |
| 75.0 | 5,100 | 76.8 |
| 73.3 | 5,100 | 75.0 |

The maximum values for the wt. percent (etherester units) are based upon the requirement that the dihydroxy constituents must be at least about 50 mole percent 1,4-cyclohexanedimethanol. Thus the maximum wt. percent (etherester units) can be as high as 93 percent when the PTMG has a molecular weight of 3900 and the PTMG is present in an amount of 90 percent by weight of the elastomeric polyester. The preferred lower value of 75 percent by weight of the PTMG constituent when its molecular weight is as high as 5100 corresponds to a value of about 77 wt. percent (etherester units). Values in excess of about 77 wt. percent (etherester units) give improved elastic recovery and other improved properties, especially when the 1,4-cyclohexanedimethanol is substantially entirely present as the trans isomer.

Although the preceding manner of defining this invention describes certain especially unobvious and preferred embodiments, this invention can be more broadly defined as providing a highly polymeric fiber-forming elastomeric polyester of essentially equimolecular amounts of dicarboxylic acid constituents (A) having from 2 to 40 carbon atoms, and dihydroxy constituents (B) as follows:

(A-1) At least 80 mole percent of said constituent (A) is a dicarboxylic acid in which the carboxy radicals are directly attached to a hexacarbocyclic ring, (B-1) At least 50 mole percent of said constituent (B) consists of at least one member of the group consisting of the position isomers of 1,4-cyclohexanedimethanol, and (B-2) The remainder of said constituent (B) consists of poly(tetramethylene glycol) having an average molecular weight between 1000 and 6500, wherein from 50 to 90 weight percent of said elastomeric polyester is said constituent B-2, said elastomeric polyester having a crystalline melting point greater than 150° C., an inherent viscosity of at least about 1.3 as measured in a mixture of 60 percent phenol plus 40 percent tetrachloroethane at 25° C., and fibers of said polyester have a percentage of elastic recovery from a 200 percent elongation which is in excess of about 90 percent.

As explained above, certain elastomeric polyesters have a tendency to separate into two phases when in a molten condition. This biphasing tendency is substantially absent when said constituent (A) consists of from 80 to 98 mole percent of said constituent (A-1) and from about 2 to about 20 mole percent of a different dicarboxylic acid, preferably an aliphatic dicarboxylic acid having from 2 to 20 carbon atoms.

Although the invention has been described in considerable detail with particular reference to certain preferred embodiments thereof, variations and modifications can be effected within the spirit and scope of the invention as described hereinabove, and as defined in the appended claims.

We claim:

1. A highly polymeric linear fiber-forming elastomeric polyester of constituents consisting essentially of equimolar proportions of a dicarboxylic acid constituent (A) and of a mixture of glycol constituents composed of (B-1) and (B-2), said linear polyester having an inherent viscosity above 1.3 as measured in a mixture of 60% phenol plus 40% tetrachloroethane at 25° C., and having a crystalline melting point greater than 150° C., and wherein said dicarboxylic acid and glycol constituents are as follows:

(A) a dicarboxylic acid having from 2 to 40 carbon atoms, and composed of from 80 to 100 mole percent of a dicarboxylic acid in which the carboxy radicals are directly attached to a hexacarbocyclic ring, (B-1) a glycol selected from the group consisting of the cis and trans isomers of 1,4-cyclohexanedimethanol, (B-2) a polytetramethylene ether glycol having a molecular structure represented by the following formula:

wherein $n$ represents an integer such that the molecular weight is in the range of from about 1900 to about 5100, the amount of glycol constituent (B-2) is from 50 to 90% by weight of said linear polyester and the amount of glycol constituent (B-1) is at least 50 mole percent of the sum of the glycol constituents (B-1) and (B-2), whereby fibers of said polyester have a percentage of elastic recovery from a 200 percent elongation which is in excess of 90% and have a tenacity of at least about 0.25 gram/denier.

2. The polyester of claim 1 wherein said constituent (A) consists of from 80 to 98 mole percent of an acid in which the carboxy radicals are directly attached to a hexacarbocyclic ring and from about 2 to about 20 mole percent of a different dicarboxylic acid, whereby said elastomeric polyester is substantially transparent in the molten state without separation into two phases.

3. The polyester of claim 2 wherein said different dicarboxylic acid is an aliphatic dicarboxylic acid having from 2 to 20 carbon atoms.

4. The polyester of claim 3 wherein said constituent (A) consists of 4,4'-sulfonyldibenzoic acid and sebacic acid.

5. The polyester of claim 3 wherein said constituent (A) consists of terephthalic acid and sebacic acid.

6. The polyester of claim 1 wherein said constituent (A) consists of from 80 to 100 mole percent of a hexacarbocyclic acid selected from the group consisting of terephthalic acid, 4,4'-sulfonyldibenzoic acid, trans-1,4-cyclohexanedicarboxylic acid, 2,6-naphthalenedicarboxylic acid and 4,4'-diphenic acid.

7. The polyester of claim 6 wherein said hexacarbocyclic acid is 4,4'-sulfonyldibenzoic acid.

8. The polyester of claim 6 wherein said hexacarbocyclic acid is trans-1,4-cyclohexanedicarboxylic acid.

9. The polyester of claim 6 wherein said hexacarbocyclic acid is 2,6-naphthalenedicarboxylic acid.

10. The polyester of claim 6 wherein said hexacarbocyclic acid is 4,4'-diphenic acid.

11. The polyester of claim 6 wherein said hexacarbocyclic acid is terephthalic acid.

12. The polyester of claim 11 wherein said constituent (B-2) has a molecular weight of from about 1900 to about 5100.

13. The polyester of claim 12 wherein said constituent (B-1) is substantially the trans isomer and said constituent (B-2) is from 75 to 90 weight percent of said elastomeric polyester.

14. The polyester of claim 13 wherein the molecular weight distribution of said constituent (B-2) is less than 1.25 whereby the permanent set of fibers of said polyester elongated first to 300 percent, relaxed to and held at 150 percent elongation for 16 hours and then released and measured after 1 minute and 60 minutes is no more than 60 percent for the 1 minute measurement and no more than 40 percent for the 60 minute measurement and said polyester has a crystalline melting point of at least about 215° C.

15. A fiber of the polyester of claim 1.
16. A fiber of the polyester of claim 2.
17. A fiber of the polyester of claim 14.
18. A film of the polyester of claim 1.
19. A film of the polyester of claim 2.
20. A film of the polyester of claim 14.

References Cited by the Examiner
UNITED STATES PATENTS

| | | | |
|---|---|---|---|
| 2,744,087 | 5/1956 | Snyder | 260—75 |
| 2,744,095 | 5/1956 | Caldwell | 260—75 |
| 2,865,891 | 12/1958 | Michel | 260—75 |
| 2,901,466 | 8/1959 | Kibler et al. | 260—75 |
| 3,013,914 | 12/1961 | Willard | 260—75 |
| 3,023,192 | 2/1962 | Shivers | 260—75 |

WILLIAM H. SHORT, *Primary Examiner.*

LOUISE P. QUAST, *Assistant Examiner.*